United States Patent [19]
Berlin et al.

[11] Patent Number: 5,894,175
[45] Date of Patent: Apr. 13, 1999

[54] PHOTO-CONTROL APPARATUS AND CIRCUIT

[75] Inventors: Donald Berlin, McHenry; Rudolph Janda, Spring Grove; Steve Baker, Cary, all of Ill.

[73] Assignee: Intermatic Incorporated, Spring Grove, Ill.

[21] Appl. No.: 08/918,991

[22] Filed: Aug. 27, 1997

[51] Int. Cl.⁶ .................................................. H01H 47/24
[52] U.S. Cl. .......................... 307/117; 340/600; 315/159; 361/176; 250/208.4
[58] Field of Search .......................... 307/117; 361/173, 361/176; 340/600; 315/159; 250/206, 214 SW, 208.4

[56] References Cited

U.S. PATENT DOCUMENTS

| | | | |
|---|---|---|---|
| 3,584,222 | 6/1971 | Nesbitt | 250/206 |
| 3,638,213 | 1/1972 | Dagle | 340/600 |
| 4,095,100 | 6/1978 | Selick | 315/159 |
| 5,629,569 | 5/1997 | Janda | 307/117 |

*Primary Examiner*—Albert W. Paladini
*Attorney, Agent, or Firm*—Brinks Hofer Gilson & Lione

[57] ABSTRACT

A photo-control apparatus comprising a photo-control circuit that includes two or more photo-cells connected in parallel that respond to ambient light. The circuit includes a switch that connects a power source to a load. When the photo-cells are exposed to ambient light, current flows through the parallel photo-cells operating the switch which disengages the load from the source. The plural parallel photo-cells in the photo-control circuit provide for improved reliability and have the potential to cost less to manufacture than a single photo-cell as used in a conventional photo-control circuit.

20 Claims, 3 Drawing Sheets

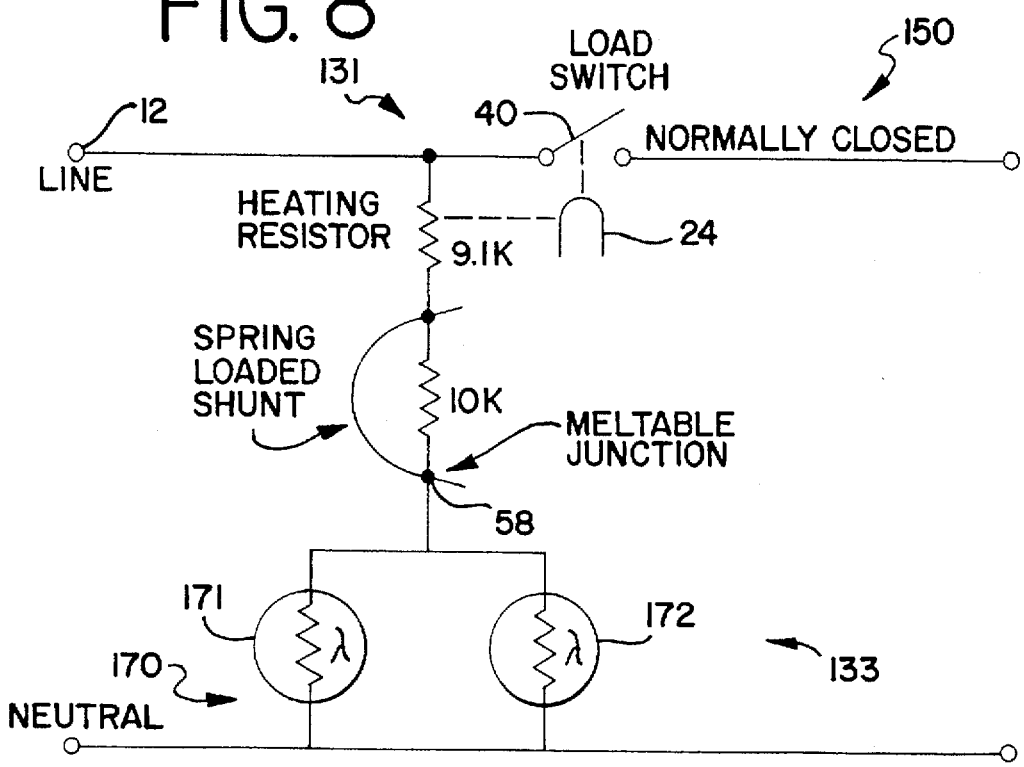
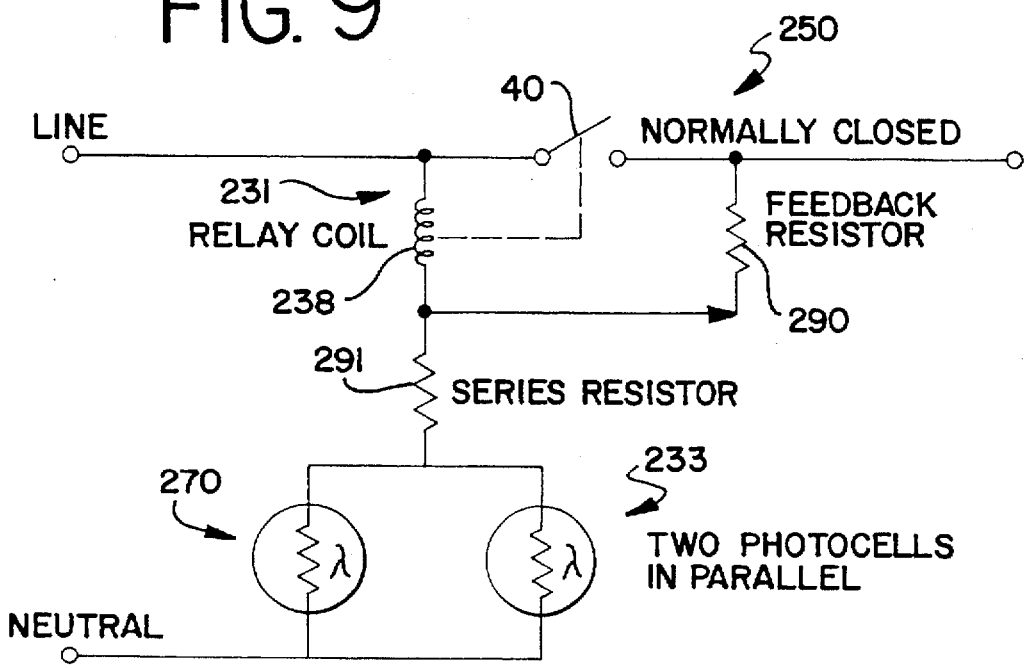

PHOTO-CONTROL APPARATUS AND CIRCUIT

BACKGROUND OF THE INVENTION

The present invention relates to photo-control devices and associated photo-control circuits for use in such devices.

Light-activated circuits (referred to herein as "photo-control circuits") are used in photo-control devices to control a wide variety of equipment including indoor and outdoor lighting, security systems, signs, as well as other kinds of electrically-operated appliances. A conventional photo-control circuit employs a photo-cell which responds to ambient light conditions.

Conventional photo-control circuits are limited by the ratings of their components. Photo-control circuits that are used in photo-control devices to drive smaller loads often employ components that can handle only small load currents, whereas photo-control circuits that are used in photo-control devices that drive large loads require scaling components or components with high power handling capacity. While both configurations provide light-activated control, each presents disadvantages. For instance, photo-control circuits designed to drive small loads have limited utility. Photo-control circuits that have high power capabilities, however, are not ideal substitutes as the required components increase cost. Another disadvantage of conventional photo-control circuits is reliability. When a photo-cell fails, the entire photo-control device fails.

FIGS. 1–3 depict a conventional type of photo-control device 10. FIG. 1 shows a front view, partially cut away, of the device 10. The device 10 includes a photo-control circuit 11 located in a housing 12. The housing 12 includes a translucent or transparent panel 14. Behind the panel 14 is located a single photo-cell 16 mounted on a mounting plate 18. The single photocell 16 comprises part of the conventional photo-control circuit 11. As shown in FIG. 2, behind the mounting plate 18 are located the remaining components 19 of the photo-control circuit 11. FIG. 3 shows a circuit diagram of the photo-control circuit 11 of the conventional photo-control device 10. The photo-control circuit 11 has an input 20 comprised of a line input 22 and a neutral 24. The conventional photo-control circuit 11 has an output 26 comprised of an output line 28 and a neutral 30. The input 20 connects to a power source 32 and the output 26 connects to a load 34. The single photo-cell 16 is connected in a first current path 36 between the line input 22 and the neutral 24. In this conventional device, the single photo-cell 16 has a 1 watt rating and a corresponding 1 inch diameter size. A heating resistor 38 is also in the first current path 36. The heating resistor 38 has a rating of 9.1 K Ohms. A switch 40 is connected in a second current path 39 between the input line 22 and the line output 28. The switch 40 is operated by a bimetal element 42 which in turn opens and closes the switch 40 relative to the heat generated by the heating resistor 38. When the photo-cell 16 is exposed to light, its resistance decreases which results in increased current flow through the branch 36 causing the heating resistor 38 to dissipate additional heat. The additional heat forces the bimetal element 42 to expand which moves the switch 40 into an open position disengaging the load 34 connected to the output terminal 28 from the source 32 connected to the input terminal 22. In the absence of significant light, the increased resistance of the photo-cell 16 limits the flow of current through the branch 36 which in turn limits the heat generated by the heating resistor 38. Without additional heat, the switch 40 returns to and remains in a normally closed position coupling the load 34 attached to the output terminal 28 to the source 32 coupled to the input terminal 22.

A problem that can be encountered with this type of circuit is that the photo-cell may fail. Under a normal failure mode, the photo-cell opens which in turn prevents the switch, e.g. 40, from disengaging from its normally closed position. While the use of premium photo-cells may improve reliability, these components have certain disadvantages. Premium photo-cells may not be readily available and may only have a limited operating range. Premium photo-cells sell at a high cost. Also, if a premium photo-cell fails, the control circuit will still also fail.

It is therefore an object of the invention to provide an improved photo-control device that improves reliability over the prior art.

Another object of the invention is to provide a photo-control device that is less expensive to manufacture.

SUMMARY OF THE INVENTION

Pursuant to the invention, a photo-control circuit is provided that uses light to regulate the operation of a load. The photo-control circuit includes two or more photo-cells connected in parallel that respond to ambient light and a switch that connects the power source to the load. When a voltage source is attached to the input terminals and the photo-cells are exposed to ambient light, current flows through the parallel photo-cells operating the switch which thereby disengages the load from the source.

BRIEF DESCRIPTION OF THE DRAWINGS

FIG. 8 is a schematic diagram of an alternative embodiment of a photo-control circuit for use in a photo-control apparatus.

FIG. 9 is a schematic diagram of another alternative embodiment of a photo-control circuit for use in a photo-control apparatus.

DETAILED DESCRIPTION OF THE PRESENTLY PREFERRED EMBODIMENTS

Figure 5:
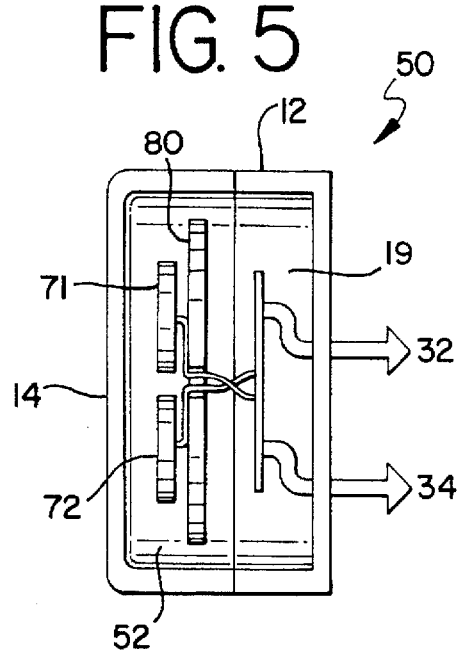
FIG. 5 is a sectional side view of the photo-control apparatus of FIG. 4.
Figure 6:
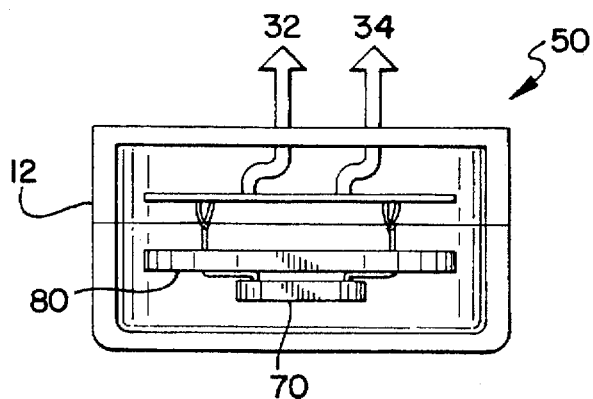
FIG. 6 is a sectional top view of the photo-control apparatus of FIG. 4.
Figure 7:
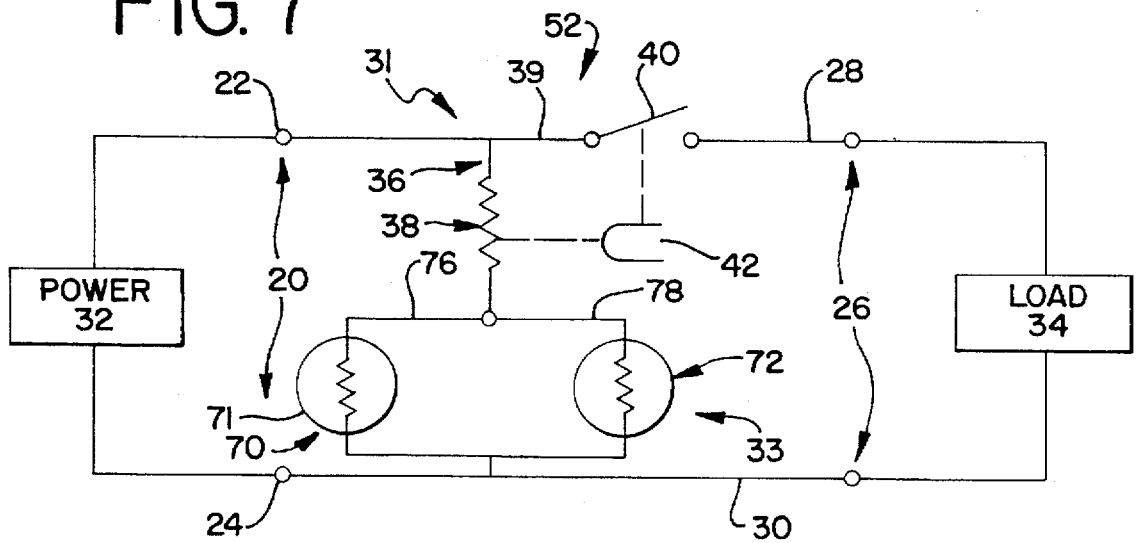
FIG. 7 is a schematic diagram of the photo-control circuit used in the photo-control apparatus of FIG. 4.

FIGS. 4–7 show a first embodiment of the present invention. In this embodiment, some of the components may be similar or identical to the components in the conventional photo-control device 10, and like components are labeled with the same numerals. A photo-control device 50 includes a housing 12 having a transparent or translucent panel 14. A photo-control circuit 52 according to the first embodiment is located in the housing 12. The embodiment of the photo-control apparatus 50 has an input 20 for connection to a power source 32 and an output 26 for connection to a load 34. A first stage 31 of the circuit 52 operates to switch the power source 32 to the load 34 and a second stage 33 of the circuit 52 operates to control the first stage 31 based upon the incidence of light. In the embodiment of FIG. 7, the second stage 33 includes a plurality of photocells 70. The plurality of photocells 70 and a heating resistor 38 are located in a first current path 36 between the input 22 and a neutral 24. In this embodiment, the photo-cells 70 comprise two photo-cells, 71 and 72, which are connected in parallel with each other and in series with the heating resistor 38. A bimetal element 42 is connected to and operates a switch 40 that is in a second current path 39 between the input 22 and the output 28. The photocells 71, 72, each have a rating of 400 milliwatts and a corresponding size of ½ inch diameter.

Figure 4:
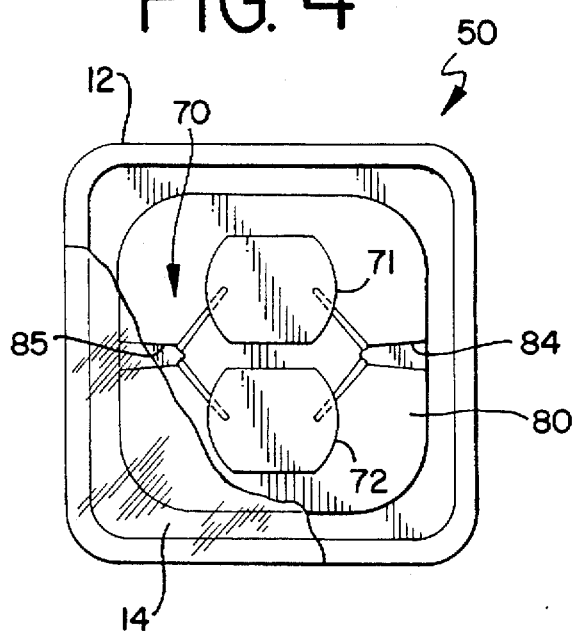
FIG. 4 is a partially cut away front view of a photo-control apparatus according to a first embodiment.

Referring to FIGS. 4–6, the parallel connected photo-cells 70 are mounted adjacent to each other on a mounting plate 80. The mounting plate 80 has an overall size that corresponds to the dimensions of the mounting plate 18 used in the conventional photo-control device 10 so that the embodiment of FIGS. 4–7 can be installed in a conventionally sized housing 12 without significant modification. The two photo-cells 71 and 72 are mounted on the mounting plate 80 adjacent to each other behind the transparent panel 14 so that they are responsive together to the same ambient light which is incident upon the parallel photo-cells 70 through the transparent (or translucent) panel 14. The mounting plate 80 includes appropriate fasteners and cut-outs for mounting the plurality of photo-cells adjacent to each other behind the panel 14. The mounting plate 80 includes a pair of openings or notches 84 and 85. Each of the photo-cells, 71 and 72, has a pair of leads. One lead from each of the photo-cells is positioned through one of the pair of openings in the mounting plate 80 and the other lead from each of the photo-cells is positioned through the other of the pair of openings in the mounting plate 80. The leads are wired to the remaining components 19 in the photo-control circuit 52.

Although the circuit 52 depicted in FIGS. 4–7 shows two photo-cells, it may include more than two, for example, three, four, five, and so on. Appropriate modification of the mounting plate 80 and/or the remaining portions of the circuit, as necessary, may be made.

In the present embodiment, the heating resistor 20 has a value of 9.1 K Ohms. The half inch diameter photo-cells 71 and 72, are enclosed in a notched plastic cell retainer, and are conventional cadmium-sulfide photo-cells. Suitable photo-cells are manufactured by Silonix, Vactec, Heineman and other manufacturers.

The photo-control apparatus 50 will operate when it is connected to a suitable power source and load. For example, when the photo-control apparatus 50 is connected to a 120 volt source and exposed to light, the resistance of the photo-cells 71 and 72 decreases which results in increased current flow through the first current path 36 which is then divided nearly equally between the parallel current paths 76 and 78 associated with the photo-cells 71 and 72, respectively. The increased current flow through the first current path 36 causes the heating resistor 38 to dissipate additional heat. The additional heat forces the bimetal element 42 to expand which moves the switch 40 into an open position disengaging the load 34 connected to the output terminal 28 from the source 32 connected to the input terminal 22. In the absence of light, the increased resistance of the photo-cells 71 and 72 limits the flow of current through the first current path 36 which in turn limits the heat generated by the heating resistor 38. Without additional heat, the switch 40 remains in a normally closed position coupling the load 34 attached to the output terminal 28 to the source 32 coupled to the input terminal 22.

Figure 1:
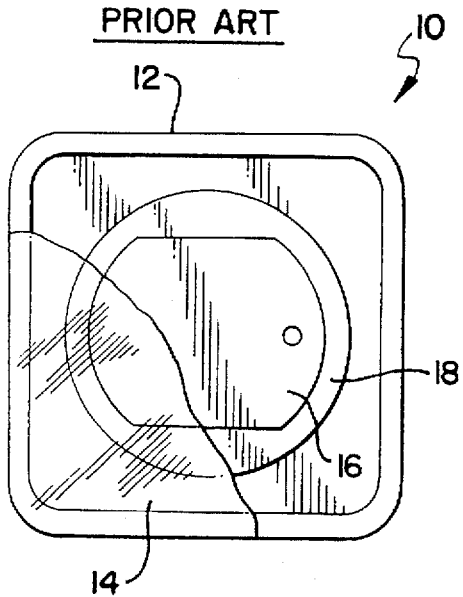
FIG. 1 is a partially cut away front view of a prior art photo-control device.
Figure 2:
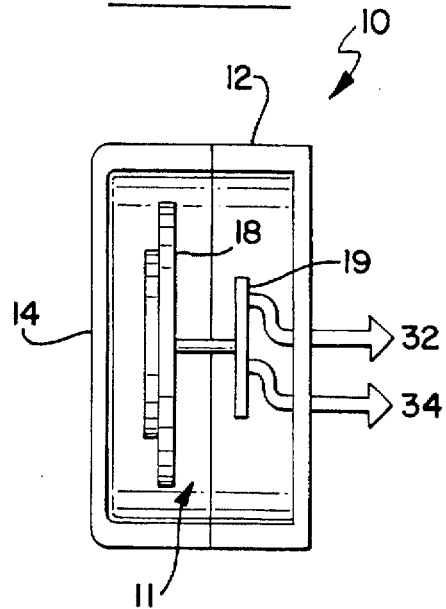
FIG. 2 is a sectional side view of the prior art photo-control device of FIG. 1.
Figure 3:
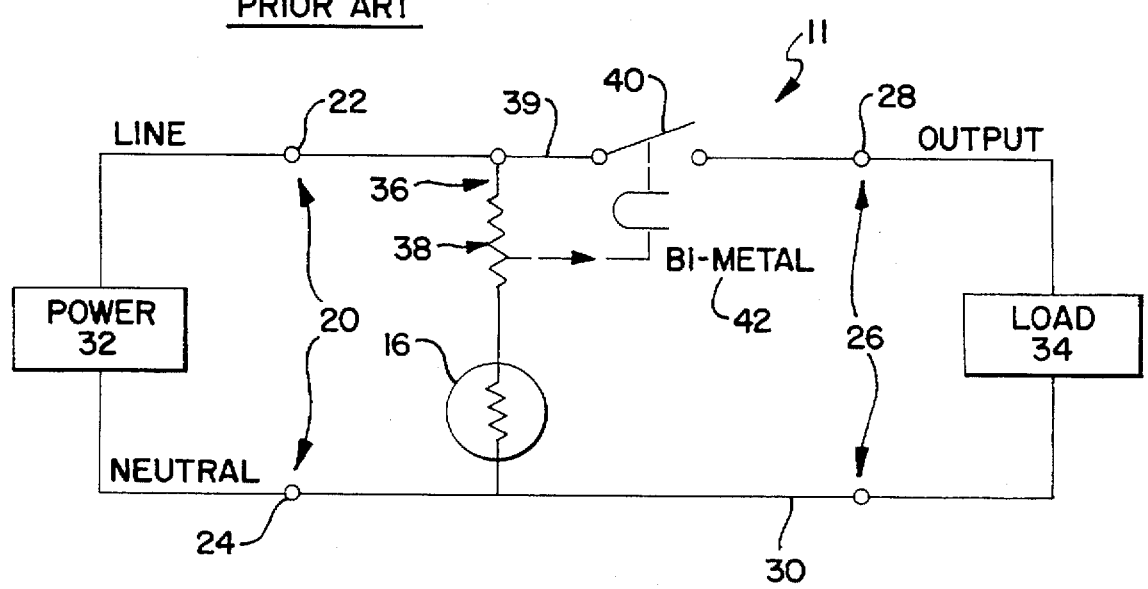
FIG. 3 is a schematic diagram of the photo-control circuit used in the prior art photo-control device of FIG. 1.

The present embodiment of the photo-control circuit has advantages over the known prior art. One advantage of the circuit shown in FIG. 7 is the ability to carry higher load currents than the single, larger surface area photo-cell used in the circuit of FIG. 3. Another advantage of the embodiment described above is the ability of the circuit to operate after a component fails. If a photo-cell fails, it normally opens which effectively removes the photo-cell and all serially connected components from the circuit. This leads to a failure of the device as the circuit is no longer functional. However if more than one photo-cell are connected in parallel, the photo-control circuit can continue to function as continuity is sustained by the remaining photo-cells.

Still another advantage of the embodiment described above is its low cost. Adding components to a circuit typically increases cost. In this embodiment, however, the increased number of photo-cells used in this embodiment in comparison to the known prior art devices reduces this embodiment's cost. In the disclosed embodiment, the photo-circuit uses at least two one-half inch diameter photo-cells to replace a single one-inch diameter photo-cell. Since one-inch diameter photo-cells can be relatively more difficult to manufacture, they typically cost more than two standard one-half inch diameter photo-cells.

FIG. 8 shows an alternate embodiment of a photo-control circuit 150 for use in a photo-control apparatus. The photo-control circuit 150 shown in FIG. 8 is similar to the circuit disclosed in U.S. Pat. No. 5,629,569, the entire disclosure of which is incorporated by reference herein, with the exception that the single photo-cell has been replaced with parallel photo-cells 170. In the embodiment of FIG. 8, a first stage 131 is reconfigurable so that it can be used with different operating voltages. As in the previous embodiment, the first stage 131 is responsive to the second stage 133 which comprises the parallel photocells 170.

FIG. 9 shows another alternative embodiment of a photo-control circuit 250 with parallel photo-cells 270. The second stage 233 includes parallel photo-cells 270. These parallel photo-cells 270 are in series with a first stage 231 which includes a relay coil 238 which is used to operate a switch 40, as in the previously described embodiments. A feedback resistor 290 connects back from an output side of the switch 40 to the relay coil side of a series resistor 291. The operation of this circuit is similar to that of the previously described circuits.

There are many changes and modifications that can be made to the invention without departing from its spirit. The foregoing detailed description is intended to be illustrative rather than limiting and that it is understood that the following claims are intended to define the scope of the invention.

We claim:

1. A photo control apparatus comprising:
   a light responsive control circuit, said control circuit comprising
   input terminals connected to a power source and output terminals connected to a load;
   a plurality of photo-cells; and
   a switch operably connected between the input and the output terminals of said control circuit and responsive to the current flow through the plurality of photo-cells;
   said apparatus further comprising:
   a panel through which light can be transmitted;
   wherein said plurality of photo-cells are mounted adjacent to said panel to receive light transmitted through said panel.

2. The apparatus of claim 1 wherein the load is disconnected from the power source when the current flow through the photo-cells is above a turn-off threshold.

3. The apparatus of claim 1 wherein a heating resistor is serially connected between the power source and the plurality of photo-cells and the switch comprises a normally closed thermally actuated switch positioned in close proximity to the heating resistor.

4. The apparatus of claim 1 wherein a relay coil is serially connected between the power source and the plurality of photo-cells and the switch is operable in response to said relay coil.

5. The apparatus of claim 1 wherein the switch is a normally closed switch.

6. The apparatus of claim 1 wherein the plurality of photo-cells are connected in parallel.

7. An improved photo-control apparatus comprising a photo-control circuit comprising:

a first stage coupled between a power supply and a load; and a second stage coupled to said first stage and operable to control said first stage based upon incidence of light upon said second stage, wherein said second stage comprises:

at least two photo-cells coupled in parallel;

wherein said apparatus further comprises:

a transparent or translucent panel;

wherein said at least two photo-cells are mounted adjacent to said panel.

8. The improved photo-control circuit as defined in claim 7, further comprising means for holding the parallel photo-cells in place.

9. The improved photo-control circuit as defined in claim 8, wherein said means for holding the parallel cells in place comprises a plastic cell assembly.

10. An improved photo-control apparatus comprising:

a housing;

a mounting retainer located in said housing; and a photo-control circuit enclosed in said housing for controlling the coupling of a load to a power source, said photo-control circuit comprising:

a plurality of photo-cells mounted on said mounting retainer, said plurality of photo-cells electrically connected in parallel; and a switching circuit responsive to current flow through the plurality of photo-cells for coupling the load to the power source.

11. The improved photo-control circuit of claim 10 wherein the housing has a panel through which light can be transmitted and wherein said plurality of photo-cells are located adjacent to said panel.

12. The improved photo-control circuit of claim 10 wherein the mounting retainer has corresponding openings formed therethrough to provide adjacent parallel positioning of the photo-cells.

13. An improved photocontrol apparatus comprising:

a housing having a transparent or translucent panel;

a photo-control circuit located in said housing, said photo-control circuit comprising:

a first stage comprising a switch coupled between input terminals for connection to a power source and output terminals for connection to a load, and a second stage comprising a plurality of photo-cells electrically coupled in parallel and located adjacent to each other behind said transparent or translucent panel such that ambient light can impinge thereupon, wherein said first stage is coupled to said second stage and operates in response thereto.

14. An improved photo-control apparatus comprising a photo-control circuit comprising:

a first stage coupled between a power supply and a load; and a second stage coupled to said first stage and operable to control said first stage based upon the incidence of light upon said second stage, wherein said second stage comprises:

at least two photo-cells;

wherein said apparatus further comprises:

a transparent or translucent panel;

wherein said at least two photo-cells are mounted adjacent to said panel.

15. The improved photo-control circuit as defined in claim 14, further comprising means for holding said at least two photo-cells in place.

16. The improved photo-control circuit as defined in claim 15, wherein said means for holding the parallel cells in place comprises a plastic cell assembly.

17. An apparatus for supporting a plurality of photo-cells comprising a mounting panel having openings therethrough wherein each of said plurality of photo-cells is supported adjacent to each other on said mounting panel.

18. The apparatus as defined in claim 17 wherein said mounting panel comprises a plastic cell retainer.

19. An improved photo-control apparatus comprising:

a housing having a transparent or translucent panel; and a photo-control circuit located in said housing, said photo-control circuit comprising:

a first stage comprising a switch coupled between input terminals for connection to a power source and output terminals for connection to a load; and a second stage comprising a plurality of photo-cells located adjacent to each other behind said transparent or translucent panel such that ambient light can impinge thereupon, wherein said first stage is coupled to said second stage and operates in response thereto.

20. The apparatus as defined in claim 19, further comprising a mounting plate located within said housing and having openings therethrough, wherein said plurality of photo-cells are mounted adjacent to each other on said mounting plate.

* * * * *